United States Patent [19]

Fleischer et al.

[11] 4,264,849
[45] Apr. 28, 1981

[54] APPARATUS FOR POSITIONING A MOVABLE DEVICE, ESPECIALLY THE PASSENGER SEATS IN A MOTOR VEHICLE

[75] Inventors: Helmut Fleischer, Schwieberdingen; Erich Schneider, Kirchheim, both of Fed. Rep. of Germany

[73] Assignee: Robert Bosch GmbH, Stuttgart, Fed. Rep. of Germany

[21] Appl. No.: 923,913

[22] Filed: Jul. 12, 1978

[30] Foreign Application Priority Data

Jul. 29, 1977 [DE] Fed. Rep. of Germany ....... 2734264
Apr. 28, 1978 [DE] Fed. Rep. of Germany ....... 2818806

[51] Int. Cl.³ .............................................. G05B 19/42
[52] U.S. Cl. ................................... 318/568; 318/603; 318/103; 297/330
[58] Field of Search ............... 318/568, 603, 103, 112, 318/561; 297/330

[56] References Cited

U.S. PATENT DOCUMENTS

| | | | |
|---|---|---|---|
| 3,042,170 | 7/1962 | Tschirf et al. | 318/568 X |
| 3,414,785 | 12/1968 | Orahood et al. | 318/341 X |
| 3,611,101 | 10/1971 | Kiffmeyer et al. | 318/603 |
| 3,648,143 | 3/1972 | Harper et al. | 318/562 |
| 4,061,953 | 12/1977 | Matsumoto | 318/603 X |
| 4,128,797 | 12/1978 | Murata | 318/568 X |

*Primary Examiner*—B. Dobeck
*Attorney, Agent, or Firm*—Frishauf, Holtz, Goodman & Woodward

[57] ABSTRACT

To improve the speed and simplicity of adjustment of mechanical devices, for example passenger seats and other movable members in motor vehicles, there is provided a closed-loop control system in which servo-motors adjust the final positions of the movable members. The desired configurations, i.e. the positions of the individual members of the device are stored in one or more memories for recall upon the actuation of push-buttons. The same push-buttons are used alone or in conjunction with a data storage switch to store new positions in the memory. The servo-motors are coupled to transducers which generate an electrical signal related to the position of the servo-motors and their associated movable members. Upon actuation of one of the push-buttons, the device is adjusted until the control deviation is near-zero, i.e. until the signal from the transducers conforms to the data stored in the memory.

21 Claims, 7 Drawing Figures

APPARATUS FOR POSITIONING A MOVABLE DEVICE, ESPECIALLY THE PASSENGER SEATS IN A MOTOR VEHICLE

The present invention relates to an automatic positioning apparatus, especially for preselecting the positions occupied by portions of the motor vehicle passenger seats. A number of preselected positions may be stored in storage elements of the apparatus and these preselected positions may then be obtained by actuation of an associated push button. The preselected positions may be stored in the apparatus by actuating an encoding switch. The apparatus includes a control loop which changes the actual position of the passenger seats until the preselected position is attained.

BACKGROUND AND PRIOR ART

Automatic positioning apparatus, especially for positioning motor vehicle passenger seats, is known in the art, for example, from the British Pat. No. 1,459,205. In this known apparatus, the final position is attained by the actuation of limiting switches which has the disadvantage of considerable mechanical complication and a tendency to malfunction. Furthermore, the storage of a preselected set of positions is possible only with considerable expense.

THE INVENTION

It is a principal object of the present invention to provide an automatic positioning apparatus which permits the storage of a large and nearly limitless number of desired positions and their immediate recall without undue technical complexity. It is a feature of the present invention that the storage and the recall of the preselected positions may occur by simple application of a push button.

Briefly, the apparatus includes a control loop in which the nominal, i.e. command, value is supplied by at least two electronic storage devices while the actual value is obtained from mechanical-to-electrical converters associated with the positioning devices of the apparatus. The apparatus includes a number of switches for permitting the inclusion of the data storage elements into the control loop.

It is a feature of the present invention to include a special switch which actuates the data storage so that the switches normally used for recalling the preselected positions are also used for re-loading the data storage until such time as a preselectable control loop deviation is obtained, in particular the control loop deviation of the value zero.

It is yet another feature of the invention that, when the power supply voltage is applied to the apparatus, the data storage circuits are loaded with values relating to the momentary actual positions of the moveable members, for example, the positions of the passenger seats in the vehicle. This feature insures that the positioning members do not attain an undefined position when first supplied with power or when actuated inadvertently.

Yet another feature of the invention is to provide gating circuitry which permits the actuation of the positioning switch as an emergency switch that arrests the control process when this is desired by the operator.

Two preferred exemplary embodiments of the invention are shown in the accompanying drawing.

DETAILED DESCRIPTION OF THE INVENTION

Figure 1:
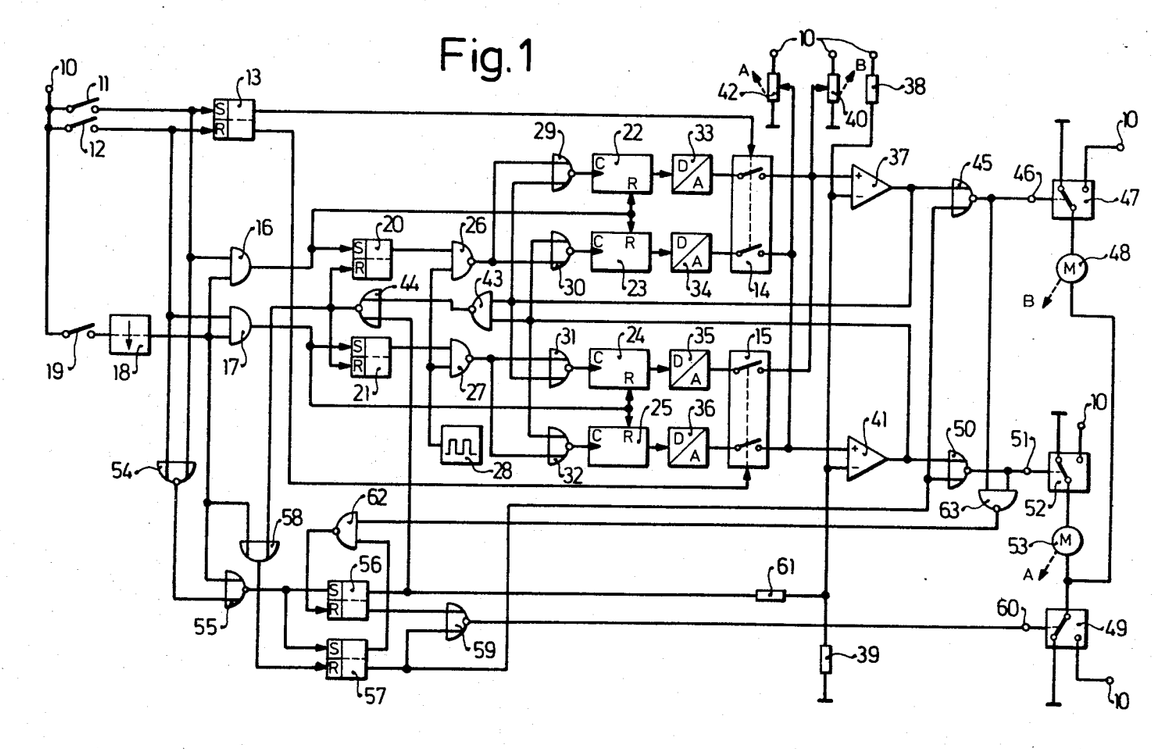
FIG. 1 is a complete circuit diagram of a first preferred exemplary embodiment of the apparatus of the invention.

The circuit illustrated in FIG. 1 has a number of switches, all of which are to be connected to the positive side of a power supply 10. In particular, supply 10 is connected to one side of two momentary push-button switches 11 and 12 which are connected, respectively, to the set input and the reset input of a flip-flop 13 which operates as a signal storage element. Each of the switches 11 and 12 serves to indicate a preselected set of positions assumed by the final control elements. If more than two such preselected set of positions are desired, the flip-flop 13 may be replaced by a multiple latch circuit, for example the integrated circuit marketed under the designation CD4042 by, for example, the commercial firm RCA. The complementary outputs of the flip-flop 13 are connected to the switch control inputs of respective multiple switches 14 and 15, for example integrated circuits of the type 4016 marketed by the firm RCA. Serially connecting a number of such switch units 14, 15 permits an unlimited number of switches to be actuated by the same control signal.

The two inputs of the flip-flop 13 are further connected to respective first inputs of two AND gates 16, 17 whose respective second inputs are connected to the output of a timing element 18 which produces a delayed negative-going transition. The timing element 18 is actuated by a push-button 19, subsequently referred to as data entry switch 19, the other electrode of which is connected to the contact 10 receiving a positive supply voltage. The outputs of the two AND gates 16, 17 are connected firstly to the set input S of two flip-flops 20, 21. Furthermore, the output of the gate 16 is connected to the reset inputs of two counters 22, 23, while the output of the gate 17 is connected to the reset inputs of two counters 24, 25. One of the outputs of each of the flip-flops 20, 21 is connected to one input of NAND gate 26, 27, the other inputs of which are connected to a clock pulse generator 28. The output of the NAND gate 26 is connected via two NOR gates 29, 30 to the clock inputs of the counters 22, 23 while the output of the NAND gate 27 is connected via two NOR gates 31, 32 to the clock inputs of the counters 24, 25. The counter outputs of the counters 22, 23 are connected to respective digital-to-analog converters 33, 34 which produce analog signals applied to one contact of the switches within the multiple switch 14 while the counter outputs of the counters 24, 25 are connected via respective digital-to-analog converters 35, 36 to contacts of the switches contained within the switch unit 15.

One of the switches in each of the switch units 14, 15 is connected to the non-inverting input of a first control amplifier 37, whose inverting input is connected via a resistor 38 to the aforementioned contact 10 and via a resistor 39 to the negative or ground side of the circuit. The non-inverting input of the operational amplifier 37 is further connected to the tap of a preferably rotary, spindle-type potentiometer 40, the resistor portion of which is connected between the contact 10 and ground. Respective second outputs of the switch units 14, 15 are connected in similar manner to an operational amplifier 41, a potentiometer 42 and the voltage divider consisting of the aforementioned resistors 38, 39.

The output of the operational amplifier 37 is connected to respective second inputs of the NOR gates 29, 31 as well as to a first input of a NAND gate 43. The output of the NAND gate 43 is connected via a NOR gate 44 to the reset inputs R of the two flip-flops 20, 21.

The output of the operational amplifier 37 is connected via a NOR gate 45 to a contact 46 which constitutes the control input contact of a switch 47. The switching arm of the switch 47 is permanently coupled to one electrode of a final control element, preferably a setting motor 48 which is the final control element for adjusting one of the desired positions of an associated apparatus, for example the aforementioned passenger seats in a motor vehicle. The other electrode of the motor 48 is connected to the switching arm of a further switch 49. In analogous manner, the output of the operational amplifier 41 is connected via a NOR gate 50 to a contact 51, a switch 52 and a servo motor 53. Respective switching contacts of the switches 47, 49, 52 are coupled to ground and to the positive voltage supply contact 10. Detailed construction of the switches 47, 49, 52 and their association with the servo motors 48, 53 will be discussed in greater detail in connection with the illustration of FIG. 2. The servo motors 48, 53 are mechanically coupled to the taps of the potentiometers 40, 42 as indicated by the dashed arrows A, B. This mechanical coupling may be provided in a preferred exemplary embodiment by directly attaching the spindle type potentiometer to the drive shafts of the servo motors. In this way, a single type of potentiometer may be used for a large variety of servo motors and final control elements. Another exemplary embodiment is possible in which the shaft of the servo motor rotates a contactless transducer, preferably an inductive transducer.

The two inputs of the flip-flop 13 are connected via a NOR gate 54 with the input of a further NOR gate 55 whose second input is connected to the output of the timing member 18. The output of the NOR gate 55 is connected to the set inputs S of two further flip-flops 56, 57. The output of the timing member 18 is then further connected via an OR gate 58 with the reset input R of the flip-flop 57. The second input of the OR gate 58 is connected to the output of the NOR gate 44. The flip-flop 57 serves to release or block the servo devices 48, 53 and its output is connected for this purpose to a further input of each of the NOR gates 45, 50. Furthermore, this output is connected to one input of a NOR gate 59. The other flip-flop 56 serves to indicate the direction of motion of the final control elements 48, 53 and one output is connected via the NOR gate 59 to a contact 60 which in turn is connected to the control input of the switch 49. The complementary output of the flip-flop 56 is connected to one input of the NOR gate 44 as well as via a resistor 61 to the inverting inputs of the operational amplifiers 37, 41. The complementary output of the flip-flop 57 is connected via a NAND gate 62 with the reset input R of the flip-flop 56. The contacts 46, 51 are connected via a NAND gate 63 with a further input of the NAND gate 62.

Operation, with reference to FIG. 1. In accordance with the invention, present position in an adjustable apparatus, for example in the passenger seat of a motor vehicle whose positions are set by servo motors 48, 53, can be obtained selected and automatically, by the actuation of the push-buttons 11, 12. Thus, for example, the servo motor 48 causes the forward and rearward adjustment of the passenger seat while the servo motor 53 causes the adjustment of the inclination of the seat back. Still other servo motors can be used to adjust the height of the seat and the tilt angle. The push-buttons 11, 12, etc., can be associated with the particular positions desired by different persons. However, one of the push-bottons 11, 12 can also be used as a door contact. In that case, the preset displacement may be merely a single backward or forward motion executed by a more economical data storage. For example, when the door switch is actuated, the seat may preferably move to a median position so as to facilitate entry into the vehicle for tall persons if, for example, a shorter person has previously occupied the vehicle seat. However, the present invention is expressly not limited to the adjustment of motor vehicle seats but may be used for the automatic adjustments of a large variety of movable apparatus, for example rear view mirrors, steering wheels or other adjustable devices.

If it is desired to store in the memory an actual position of the servo motors 48, 53, i.e. an actual position of the associated vehicles seats, it is necessary to operate data entry switch button 19 and one of the position switches 11, 12, depending on which one of these two position switches is to be used later to recall the preset position. If the desired position switchs is the switch 11, then its actuation will cause the flip-flop 13 to be set, whereupon the switch in the switching unit 14 close and the switches of the unit 15 open. In this manner, the counters 22, 23 become effective whereas the counters 24, 25 remain stopped. The timing element 18 causes the signal of the storage actuation switch 19 to be maintained for a certain period of time so that the inputs to the AND gate 16 are temporarily equal, thereby setting the flip-flop 20 and resetting the counters 22, 23. The clock signals from the clock generator 28 pass through the NAND gate 26 and the NOR gate 29 to the counter 22 and also via the NOR gate 30 to the counter 23. These clock signals are added in the counters. The contents of the counters 22, 23 are converted by the digital-to-analog converter 33, 34 into analog signals which are applied to the inputs of the operational amplifiers 37, 41 via the switching unit 14. The value, i.e., amplitude, of these analog signals is affected by the position of the potentiometers 40, 42, coupled to motors 48, 53. If the input signals to one of the operational amplifiers 37, or 41, are equal or if the reference signal is slightly exceeded, the corresponding operational amplifier generates an output signal which causes the associated NOR gate 29 or 30 to be blocked for any further clock signals. Thus, the corresponding counter 22, 23 is stopped at the contents which it has then reached. If the outputs of both amplifiers 37, 41 are positive signals, the flip-flop 20 is reset via the NAND gate 43 and the NOR gate 44. This terminates the data storage process. During each such data storage process, the flip-flops 56, 57 remain reset because the output signal of the timing circuit 18 blocks the NOR gate 55 for signals from the position switches 11, 12. Thus, one of the inputs of each of the NOR gates 45, 50, 59 receives a "1" signal from the output of the flip-flop 57, thereby causing the contacts 46, 51 and 60 to carry "0" signals which cause the switches 47, 52, 59 to remain in the positions shown in the drawing. The servo motors 48, 53 remain unenergized.

The process of adjusting the positions of the servo motors 48, 53 on the basis of stored information will now be explained on the assumption that two sets of positions are stored in the counters 22–25 and that each of these sets of positions can be recalled by actuating the appropriate position switch 11 or 12. A vehicle seat which is adjusted by the servo motors 48, 53 will be assumed to be in a position corresponding to the contents of the counters 22 and 23 and associated with, i.e. moved by, the position switch 11. If the position switch 12 is now actuated, the flip-flop 13 is reset, the switches in the switching unit 14 are open whereas the switches in the unit 15 are closed. At the same time, the actuation of the switch 12 causes the NOR gates 54, 55 to set the two flip-flops 56, 57. The output of the flip-flop 57 which goes to the inputs of the NOR gates 45, 50 and 59 changes to a "0" signal. Let it be further assumed that the values stored in the counters 24 and 25 and the actual position of the seat, i.e. the actual positions of the potentiometers 40, 42, make the non-inverting input of the operational amplifier 37 more positive than the associated inverting input, whereas the non-inverting input of the operational amplifier 41 is made more negative than its associated inverting input. Accordingly, the "1" signal at the output of the operational amplifier 37 is transferred as a "0" signal to the contact 46, thereby maintaining the switch 47 in its present state. The negative output signal of the operational amplifier 41 is transferred as a "1" signal to the point 51, thereby causing the switch 52 to connect the servo motor 53 with the input contact 10. A "1" signal at the contact 60 also changes the state of the switch 49, thereby causing both sides of the servo motor 53 to be connected to the contact 10, i.e. at the same voltage, thereby remaining arrested, whereas the servo motor 48 begins to run. Once the servo motor 48 has reached its predetermined position, i.e. when equal signals are present at the inputs of the operational amplifier 37, the output of the latter changes to a "0" signal, causing the contact 46 to receive a "1" signal and causing the switch 47 to switch over, whereupon the servo motor 48 stops.

Inasmuch as "1" signals are now present at both of the contacts 46, 51, the NAND gates 63, 62 reset the flip-flop 56. The NOR gate 59 then places a "0" signal at the contact 60, causing the switch 49 to resume its original state illustrated in the drawing. The "1" signal at the output of the flip-flop 56 which passes through the resistor 61 causes the potential at the inverting inputs of the operational amplifiers 37 and 41 to be changed by a very small amount which, however, suffices to generate a "1" signal at the output of the operational amplifier 37 and thus to generate a "0" signal at the contact 46, thereby actuating the switch 47 and returning it into its original state as illustrated in the figure. Both sides of the servo motor 48 are now grounded and the servo motor 53 begins to run because its contact 51 still receives a "1" signal. The servo motor 53 runs until the non-inverting, or direct input of the operational amplifier 41 becomes more positive than the corresponding inverting input, thereby causing its ouput to become a "1" signal and the signal at the contact 51 to be a "0" signal. The switch 52 returns into its original state illustrated in FIG. 1. These events terminate the adjustment process of the servo motors and the associated seats. The outputs of both operational amplifiers 37, 41 are "1" signals which cause the NAND gate 43, the NOR gate 44 and the OR gate 58 to reset the flip-flop 57.

The manner of adjustment performed by the present apparatus, i.e. of adjusting the apparatus in a particular single direction, and thereafter to perform the adjustment in another mode, is particularly advantageous when a large number of servo motors is present because, by the serial operation, the number of required power switches is reduced. However, it is also possible to produce a simpler version of the apparatus in which a sequential operation of the above-described type is dispensed with. In that case, the output voltages of the operational amplifiers 37, 41 are directly applied to the servo motors via an appropriate logical circuit, for example that described by the German Offenlegungsschrift No. 2,350,959.

The reset signal for the flip-flop 47 which is generated at the output of the NOR gate 44 and which defines the termination of the adjustment process can also be generated during the adjustment process by the OR gate 58 via the actuation of the storage switch 19 which thus acts as a type of emergency stopping switch.

The values stored in the counters 22–25 may be retained when the power supply is turned off by employing non-volatile memories. If only volatile memories are available, it is possible to provide for them a separate and uninterrupted power supply while the remaining parts of the circuit are powered by a separate and switchable power source, thereby reducing the power consumption to a minimum.

Figure 2:
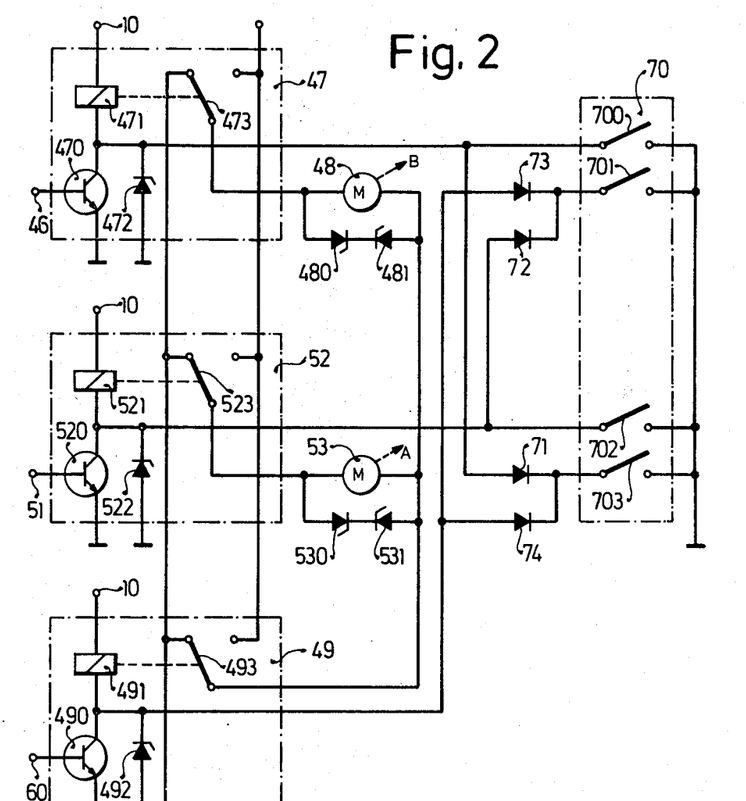
FIG. 2 is a diagram of circuitry permitting direct, manual actuation of the displaceable members.

FIG. 2 is a detailed circuit diagram of the switching elements 47, 52, 59 in combination with the elements that provide the contacts 46, 51 and 60 and also including the servo motors 48, 53. For example, the switch 47 has a contact 46 which is connected to the base of a transistor 470 whose emitter is grounded and whose collector is connected to the power supply contact 10 via the coil 471 of a relay. A protective free-running diode 472 is connected in parallel to the switching half of the transistor 470. The winding 471 of the relay controls a pair of switching contacts 473 which correspond to the contacts of the switch 47 in FIG. 1. The other switching units 52 and 49 are constructed in the same way. Two oppositely connected free-running Zener diodes 480, 481 are connected in parallel with the servo motor 48 and similar diodes 530, 531 with the servo motor 53. A control switch 70 includes four momentary contacts 700, 701, 702 and 703, one side of each of which is connected to ground. The other side of the switch 700 is connected to the collector of the transistor 470 and via a diode 71 to the second contact of the switch 703. The second contact of the switch 702 is connected to the collector of the transistor 520 and via a diode 72 with the second contact of the switch 701. Furthermore the second contacts of each of the switches 701, 703 are connected via further diodes 73, 74 to the collector of the transistor 490. The polarity of the diodes 71–74 is such that the anodes of the diodes 72 and 73 are paired, as are the anodes of the diodes 71 and 74.

The switching unit 70 containing the momentary switches 700–703 permits a manual adjustment of the position of the servo motors 48, 53 when one of these switches is actuated. For example, if the switch 700 is actuated, the collector of the transistor 470 is grounded and a current may flow through the winding 471. The switching contact 473 is moved, causing the servo motor 48 to be displaced in a first direction of motion. If the switch 701 is actuated, the collector of the transistor 490 is grounded and current flows through the winding 491. This causes a switchover of the contact 493, thereby causing the servo motor 48 to move in a second direction of adjustment. The collector of the transistor 520 is grounded via the diode 72 so that a simultaneous actuation of the switching contact 523 occurs, thereby preventing a simultaneous motion of the servo motor 53. In a similar manner, the servo motor 53 is engaged by an actuation of the switches 702, 703.

In order to reduce the power requirements of the contacts within the switching unit 49 which defines the direction of adjustment, this unit may include several relays 491, connected, for example, in parallel and jointly controlled by the transistor 490. These relays may be uncoupled from the transistor 490 by the presence of diodes thereby permitting an adjustment in opposite directions, for example by application of the switches 700–703.

Figure 3:
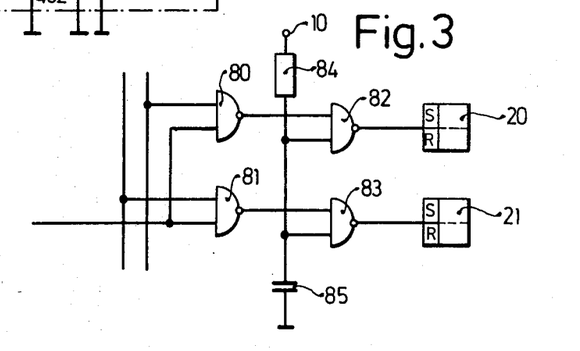
FIG. 3 is a schematic diagram of a circuit for storing the instantaneous values of the controlled members.

The circuit illustrated in FIG. 3 serves to store the prevailing values of the position of the apparatus. If this feature is desired in the apparatus, the circuit illustrated in FIG. 3 takes the place of the flip-flops 20, 21 and their input AND gates 16, 17. The four inputs of the AND gates 16, 17 are now connected with the four inputs of two NAND gates 80, 81 whose outputs are connected via further NAND gates 82, 83 to the set inputs of the flip-flops 20 and 21, i.e. to the reset inputs of the counters 22, 25. A resistor 84 and a capacitor 85 are connected in series between the power supply connections 10 and ground. The junction between the resistor 84 and the capacitor 85 is connected to one input of each of the NAND gates 82, 83.

It is the purpose of the circuit illustrated in FIG. 3 to prevent the possibility that a first or inadvertent actuation of a positioning switch 11, 12 causes the servo motors, i.e. the vehicle seats or the associated equipment, to assume an undefined position which could cause discomfort to the person actuating the switch. To prevent such an occurrence, the circuit illustrated in FIG. 3 provides that when the circuit is first supplied with power, the outputs of the NAND gates 80, 81 and thus the inputs of the NAND gates 82, 83 receive "1" signals. Until the capacitor 85 has charged up, the inputs of the NAND gates 82, 83 which are connected to the capacitor 85, however, receive "0" signals. The outputs of the NAND gates 82, 83 are thus "1" signals which cause the flip-flops 20, 21 to be set and the counters 20–25 to be reset. Thus, in a manner already described with respect to the storage of actual positions, the prevailing position of the servo motors is stored in the counters.

Figure 4:
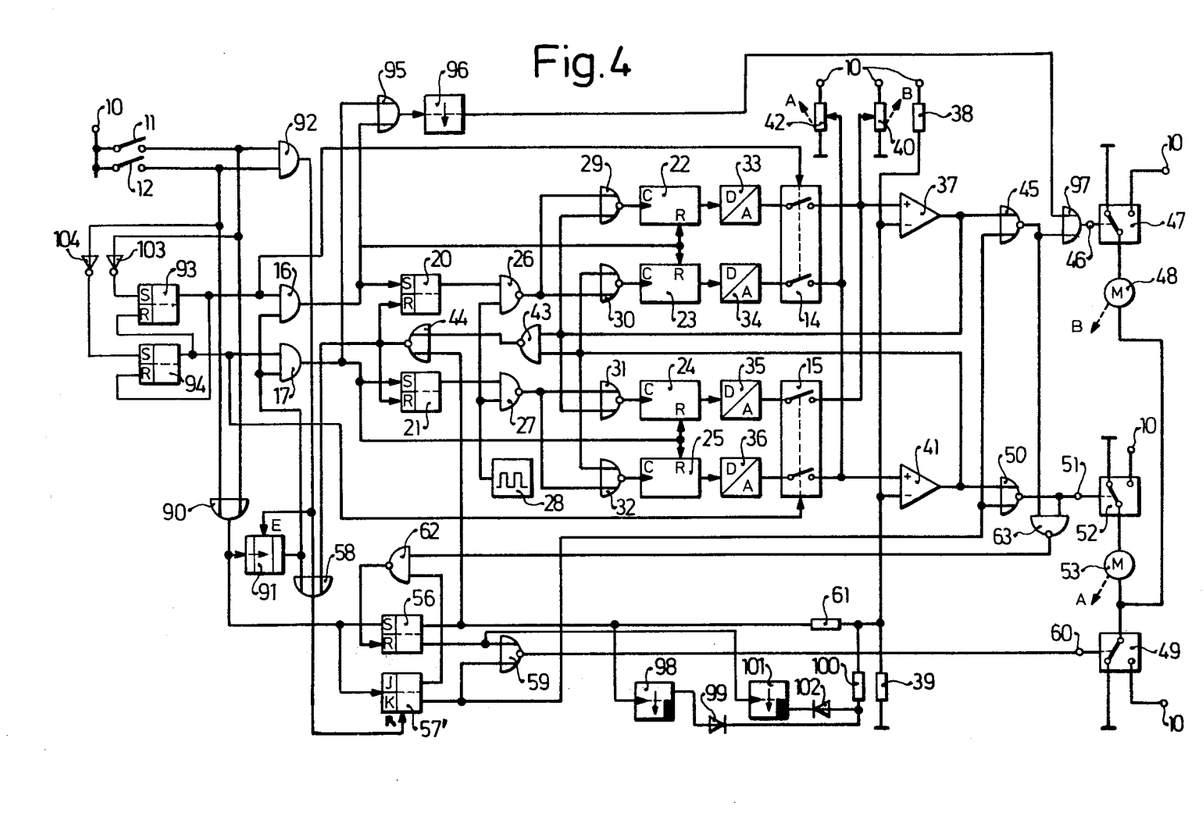
FIG. 4 is a more complete circuit diagram of a second exemplary embodiment of the apparatus of the invention.

The second exemplary embodiment illustrated in FIG. 4 corresponds in most respects to the first exemplary embodiment illustrated in FIG. 1. Identical circuit elements retain the same reference numerals and their construction and function will not be discussed again. In the second exemplary embodiment, the previous elements 13, 18, 19, 54 and 55 are no longer present. The previously described position switches 11, 12 are connected at one contact to the point 10 which supplies a positive potential and at the other contact are connected via an OR gate 90 to the set input S of the flip-flop 56 and, at the same time, to the clock input of a JK flip-flop 57' which takes the place of the previous flip-flop 57 and also to the input of a timing circuit 91. The timing circuit 91, which provides a time delay of the input pulse, is connected at the output to a further input of the OR gate 58 as well as to the joined inputs of the AND gates 16 and 17.

The positioning switches 11, 12 are also connected via an AND gate 92 to a further input of the OR gate 58 as well as to the enable input E of the timing or delay circuit 91. Finally, the positioning switches 11, 12 are connected to the set inputs S of two RS flip-flops 93, 94, the output of the flip-flop 93 being connected to the reset input R of the flip-flop 94. The switches 11 and 12 are still further connected to one input of the AND gate 16 and to the control input of the switching unit 14. Similarly, the output of the flip-flop 94 is connected with the reset input R of the flip-flop 93, with an input of the AND gate 17 and with the control input of the switching unit 15.

The outputs of the AND gates 16, 17 are connected via an OR gate 95 with the triggering input of a further timing circuit 96 whose output is connected to one input of an OR gate 97 which is disposed between the output of the NOR gate 45 and the circuit point 46.

The first output of the flip-flop 56 is connected to the dynamic input of a timing circuit 98 whose first output is connected via the anode-cathode path of a diode 99 and a series-connected resistor 100 to the junction of the resistors 61 and 39. The second, complementary output of the flip-flop 66 is connected to the dynamic input of a second timing circuit 101 whose complementary output is connected via the cathode-anode path of a diode 102 to the resistor 100.

It is a significant feature of the second exemplary embodiment shown in FIG. 4 that the function of the data storage switch 19 is performed by the positioning switches 11, 12 and their associated circuitry. The adjustment of the apparatus, for example the vehicle seats or the like, is initiated in the second exemplary embodiment by actuating the switches 11 or 12 and thereby setting the associated flip-flops 56, 57' via the OR gate 90. The actuation of the switching units 14 or 15 is then performed by the flip-flops 93 or 94. Due to the presence of the inverters 103, 104 ahead of the dynamic set-inputs of the flip-flops 93, 94, these flip-flops are set by the rear edge of the signal from the switch 11, 12, i.e. when it is released. If it is desired to change the data stored in one of the counters 22–25 instead of actuating the servo motors 48, 53, the corresponding push-button 11 or 12 must be held down at least as long as the delay time imparted by the delay circuit 91. When this time has expired, i.e. after the switch 11 or 12 has been actuated sufficiently long, the output of the delay circuit 91 will carry a signal which resets the flip-flop 57' unless it has already been reset and further releases the AND gates 16,17 thereby permitting the alternating signal at the outputs of the flip-flops 93, 94 to set one of the flip-flops 20, 21 so that the data-changing process already described above may take place. If the positioning switches 11, 12 are actuated simultaneously, an adjustment process is prevented because the AND gate 92 actuates the reset input of the flip-flop 57' and thus prevents its being set. At the same time, the delay circuit 91 is blocked by the signal at the enable input E.

If more than two sets of positions are incorporated in the apparatus, i.e. if more than two switches 11, 12 are present, the place of the AND gate 92 must be taken by a gating circuit which insures that when two or more push-button switches are depressed, an appropriate output signal is produced. In addition, the logical circuit must insure that, when further flip-flops are added to the flip-flops 93, 94, the actuation of any one of them resets all the rest.

The JK flip-flop 57 is preferably embodied as a T-type flip-flop, i.e. a logical "1" signal is applied to both the J and the K inputs. In this case, the flip-flop will switch over into its opposite state with every incoming pulse from the OR gate 90, i.e. a short actuation of one of the switches 11, 12 can set the flip-flop 57′ and thus initiate an adjustment process whereas a second short pulse applied by the same switch can reset the flip-flop 57′ and thus interrupt the adjustment process again. Each of the switches 11, 12, etc., thus has a built-in emergency stop capability. It is desirable to generate a signal which informs the user of the apparatus that his commands to store data have been registered or executed. For this purpose, the data storage command at the output of the AND gates 16,17 is used to start the timing circuit 96 via the OR gate 95. After the very short unstable time constant of the timing circuit 96, the OR gate 17 briefly actuates the servo motor 48 via the switch 47, thereby imparting to the seat or other device a short mechanical jolt which indicates that the command has been executed. The same purpose can be served by permitting the output signal of the timing circuit 96 to initiate other signals, for example to energize a buzzer or a lamp.

It is a further desired object that unnecessary switching of the relay contacts of switches 47, 52, 49 is avoided. For example, such switching is unnecessary if the path which the device or a part of the adjustable device needs to travel from its actual position to the intended position is very short. The setting of the flip-flop 56 initiates the first mode of adjustment and at the same time the timing circuit 98 is started. Accordingly, the setpoint voltage at the operational amplifiers 37, 41 is raised by a very small amount via the diode 99 and the resistor 100 during the short time constant of the timing member 98. The first adjustment motion corresponds to a decrease of the actual value signal voltage. If the difference between the actual value and the set point value was less than this short term increase of the set point value, no mechanical adjustment is made and the flip-flop 56 switches over to the second adjustment servo motor as explained with respect to the first exemplary embodiment of FIG. 1. Once the flip-flop 56 has switched, the return of the timing circuit 98 to its normal state remains without effect. The return of the flip-flop 56 to its first state triggers the second timing circuit 101. The "0" signal at the complementary output of this circuit, lowers the set point voltage at the operational amplifiers 37, 41 via the diode 101 and the resistor 100. The second direction of motion corresponds to an increase of the actual value signal so that no displacement takes place in this case as long as the difference between the set point value and the actual value is less than the change in the set point voltage. It is also possible, by a suitable change in connections, to cause a change in the actual value signal and in the opposite direction instead of performing a change of the set point value.

Figure 5:
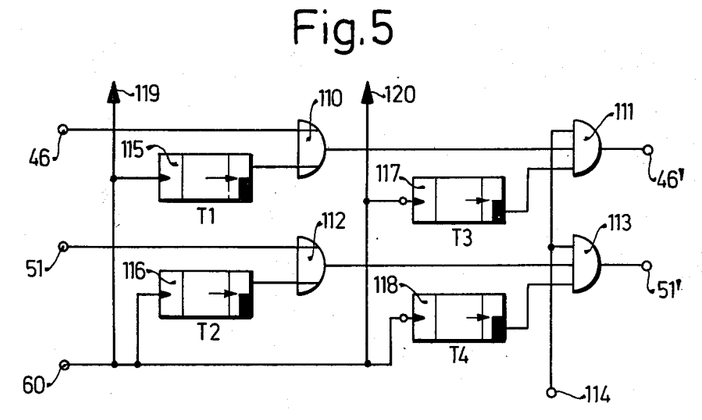
FIG. 5 is a diagram of a circuit for sequential actuation of the movable devices.

The circuit illustrated in FIG. 5 represents a circuit causing the sequential actuation of the various servo mechanisms. The circuit of FIG. 5 is to be used in the embodiments of FIGS. 1 or 4 by opening the circuit points 46, 51 and 60 and inserting the circuit with the indicated lines in the opened junctions. When this is done, the circuit point 46 is connected via an OR gate 110 to one input of an AND gate 111 whose output appears at the contact point 46′. In the same manner, the contact 51 is connected via an OR gate 112 with one input of an AND gate 113 whose output goes to the contact point 51′. A point 114, which is connected with the output of the flip-flop 57 or 57′ which carries a "1" signal during the adjustment process is also connected to a further input of the AND gates 111, 113. The circuit point 60 is connected to the dynamic inputs of two delay circuits 115, 116 and to the inverting dynamic inputs of two further delay circuits 117, 118. The output of the delay circuit 115 is connected to a further input of the OR gate 110 and the output of the delay circuit 116 is connected to a further input of the OR gate 112. The complementary output of the delay circuit 117 is then connected to a further input of the AND gate 111, while the complementary output of the delay circuit 118 is connected to a further input of the AND gate 113.

The circuit illustrated in FIG. 5 is especially favorable when a large number of adjustment servo devices 48, 53 are present. Their presence is suggested by the arrows 119, 120 which represent the addition of further identical circuit elements in parallel with those already described. The circuit of FIG. 5 is intended to reduce the high starting current pulse which would occur when a plurality of servo devices is started simultaneously. The leading edge of the signal at the contact 60 which controls the first displacement motor or servo motor also addresses the delay circuits 115, 116 which sequentially produce output signals that engage the final control elements via the AND gate 111, 113 in a rapid sequence. The AND gates 111, 113 are opened for these signals because the contact 114 carries the control signal for the whole displacement process at this time and the complementary outputs of the delay elements 117, 116 also are "1" signals in the quiescent state. The timing or delay elements 117, 118 are actuated by the rear edge of a signal at the point 60 which signals the beginning of a displacement process in a second direction. This causes a sequential delayed blocking of the AND gates 111, 113 so that the final control elements for adjusting the second direction of displacement also sequentially begin to move. The delay times are so adjusted that when the final control elements are, for example, servo motors, the first of these motors is permitted to attain its top speed before the subsequent motor is energized.

Figure 6:
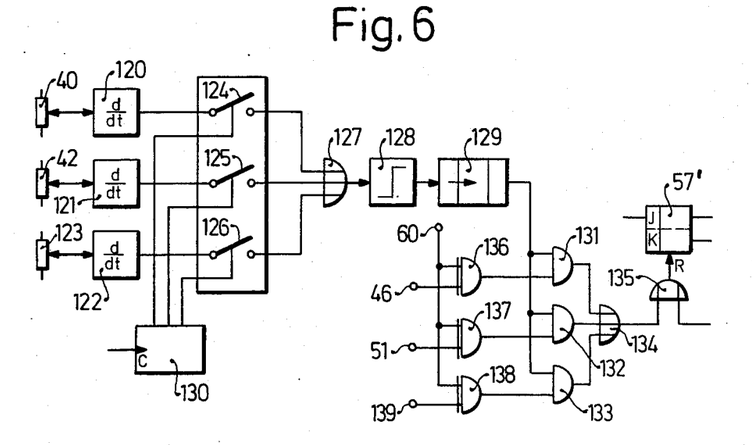
FIG. 6 is a diagram of a speed monitor circuit.

The circuit illustrated in FIG. 6 is a monitor circuit for detecting when a minimum speed of adjustment of the control elements is not reached, which would be the case, for example, when electrical lines are broken, the servo motors encounter abnormal resistance or have reached their limit of travel. In order to protect the apparatus against damage under the circumstances, the actual values of the position of the final control elements, i.e. the values present at the taps of the potentiometers 40, 42, are fed to differentiating circuits 120, 121. The input of a third differentiating circuit 122 is connected to the potentiometer 123 in a third adjustment device. The outputs of the differentiating circuits 120–122 are connected via respective switches 124, 125, 126 to the inputs of an OR gate 127 whose output is connected via a threshold switch 128 to the input of a delay circuit 129. The operation of the switches 124–126 is controlled by different outputs of a counter 130 with a built-in decoder whose clock input receives a periodic signal. The element 130 may be, for example, an integrated circuit commercially available under the type designation 4024. The output of the delay circuit 129 is then brought to one input of each of three AND gates 131, 132, 133. Their outputs are fed to respective inputs of an OR gate 134 whose output goes to one input of a further OR gate 135 that directly controls the reset contact of the flip-flop 57' or 57, as the case may be. The second input of the OR gate 135 is connected with the output of the OR gate 58, previously described. The contact 60 is connected to one input of each of three exclusive OR gates 136, 137, 138, the outputs of these gates being connected, respectively, to the second inputs of the gates 131, 132, 133, as shown in FIG. 6. The second input of the gate 136 is connected to the point 46 in the circuit of FIGS. 1 and 4 while the second input of the gate 137 is connected to the contact 51 and the second input of the gate 138 is connected to a corresponding point 139 which would be present in a third adjustment mechanism, not illustrated.

The actual signals of the positions of the various final control elements are differentiated in the circuits 120–122 so that the resulting signals, which are proportional to the velocity of adjustment of the final control elements, are available for cyclic distribution to the threshold switch 128. The cyclic distribution is performed by applying the differentiated signals to the three separate switches 124, 125, 126 and closing these switches cyclically by means of the information appearing at the decoder output of the counter 130. The signal passed by the gate 127 is applied to the threshold switch 128 which is embodied as a so-called "window comparator" which responds with a change of its output signal when the input signal lies below an upper threshold and above a lower threshold. Accordingly, this circuit does not respond if the speed of adjustment of the final control elements in the apparatus is 0, i.e. at standstill. The output signal of the threshold switch is delayed by the delay element 129 and is subsequently applied to the input of the AND gate 131–133 as previously described. If the velocity signal is aove the output threshold, all AND gates 131–133 are closed. If the velocity signal is below the upper threshold, the AND gates 131–133 are open and a test is made to determine if one of the final control elements, i.e. displacement mechanisms, is being actuated. If such is the case, i.e. when the signal at the contact 60 is different from the signal at one of the points 46, 51 or 139, and if the signal from the delay circuit 129 indicates that a minimum velocity has not been attained, the adjustment process is terminated by resetting the flip-flop 57' or 57.

Figure 7:
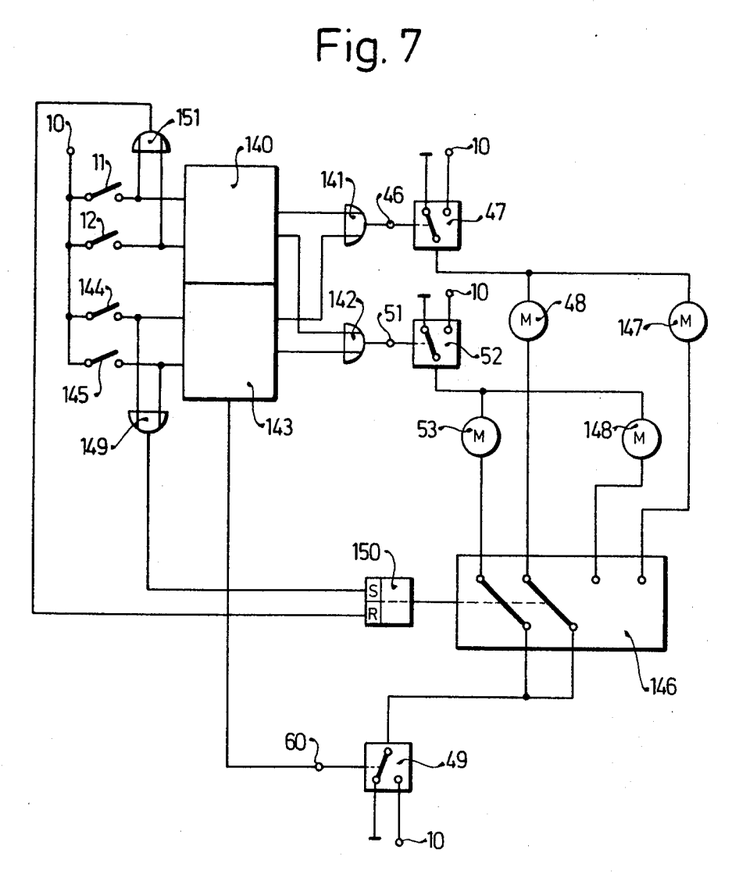
FIG. 7 is a diagram of a multiple control circuit.

The circuit illustrated in FIG. 7 has as its purpose the control of several final control elements or adjustment mechanisms by a single final control circuit. The final control mechanisms 47, 52, 49 of FIG. 1 or FIG. 4 are shown in the circuit of FIG. 7. The remaining circuit of FIG. 1 or 4 is indicated schematically as a block 140 with inputs connected to the positioning switches 11, 12 and with outputs connected via OR gates 141, 142 to the circuit points 46, 51. A second and identical functional block 143 is controlled at the input by two additional positioning switches 144, 145 and has outputs connected to further inputs of the aforementioned OR gates 141, 142. For example, the positioning switches 11, 12 could correspond to the positions assumed by a first vehicle seat while the switches 144, 145 could be assigned to the positions of another vehicle seat or to other adjustable mechanisms, for example headrests, the position of the steering wheel, the sun roof or the rearview mirror. In FIG. 1 or FIG. 4, the overall circuits represented here by the blocks 140, 143 are also connected to the circuit point 60. Two final control elements 48, 53 are connected between the final control circuits 47,52, 49, as illustrated in FIGS. 1 and 4. The junction of the output circuit 49 and the final control elements 53, 48 is provided by two switching arms of a commutator switch 146. In a second switching position, the switch 146 connects the final control circuit 49 with two further final control elements, i.e. displacement mechanisms 147, 148, whose second contacts are also connected to the final control circuits 47, 52. The switch elements 144, 145 are connected via an OR gate 149 to the set input S of a flip-flop 150 while the switches 11, 12 are connected via an OR gate 151 to the reset input R of the flip-flop 150. The output signal of the flip-flop 150 controls the switching assembly 146. If one of the positioning switches 11 or 12 is actuated, the flip-flop 150 is reset and the contact arms of the switch 146 are in the position illustrated in FIG. 7 so that the final control elements 48, 53 are adjusted via contacts 46 and 51. If one of the switches 144, 145 is actuated, the flip-flop 150 is set and the commutator 146 changes into the second switching position so that, in this case, the final control elements 147, 148 are energized via contacts 46 and 51. In this way, the same final control circuit can serve to control several sets of final control elements so that the number of control circuits can be reduced which is especially advantageous if the apparatus contains a multitude of adjustable systems. The final control circuits 47, 52 and 49 may be embodied in known manner as relays or as power transistors and thus their reduced number constitutes a substantial savings in material and cost.

The positioning of an appliance, as for example a rear-view mirror, requires only a single output control circuit embodied as switch units 47 or 52. The two directions of adjustment can be obtained by suitable clutches which are actuated sequentially by the directional switch 49. If such an apparatus is to be included in the circuit of FIGS. 1 or 4, it is necessary to supply two further memories for the data relating to the two planes of motion. If a positioning switch is then actuated, for example the push-button 11, a first switch 14 may cause the adjustment of a seat in a first direction, whereupon a second switchng device 15 causes the adjustment of the seat in a second direction. A still further switching device then causes the motion of the rear-view mirror in a first direction and a fourth switching unit causes the displacement of the mirror in a second direction.

The circuits described and illustrated in FIGS. 1 and 4 may be embodied, for example, in a microcomputer, in particular a one-chip microcomputer, in which the micro processor, as well as the operating and fixed data memories, including a clock generator, are all disposed on the same integrated chip. A microcomputer of this type may perform the functions of a single functional unit 140 as well as those of further units 143. By incorporating the overall system on a single chip, its embodiment becomes simple and inexpensive and permits a multitude of adjustments of various types in mechanisms and systems of great variety.

In a typical operating example, the circuit elements may be embodied as follows:

| | |
|---|---|
| Timing element 18 | IC type MC 14538 |
| Counters 22-25 | IC type CD 4040 |
| D/A converters 33-36 | IC type R-network |
| Op-Amps 37,41 | IC type 2902 |
| Flip-Flops 20,21 | IC type 4011 |
| Timing circuit 91 | IC type MC 14538 |
| Timing circuit 96 | IC type MC 14538 |
| Timing circuit 98 | IC type MC 14538 |
| Delay circuits 117,118 | IC type MC 14538 |
| Delay circuit 129 | IC type MC 14538 |
| Counter 130 | IC type CD 401F |

Various changes and modifications may be made, and features described in connection with any one of the embodiments may be used with any of the others, within the scope of the inventive concept.

What is claimed and desired to be secured by Letters Patent of the United States is:

1. An apparatus for making adjustments of the position of a movable device, said apparatus having
    motor means connected to the movable device for performing said adjustments and comprising
    at least one mechanical-to-electrical transducer (40, 42), coupled to said motor means (48, 53), for generating an actual value signal related to the actual position of said movable device;
    at least two independent counters (22, 23; 24, 25) for storing set-point signals related to desired positions of said movable device;
    at least two operator controllable positioning switches (11, 12) for selectively placing said counters in electrical connection with said motor means;
    means (14, 15) connected to and controlled by said positioning switches (11, 12) for selectively connecting said counters, said at least mechanical-to-electrical transducer and said motor means in
    a closed control loop to make selective adjustments of said movable device to one of a number of predetermined positions as determined by the count state of the respectively selected counter in accordance with selected operation of said positioning switches; and
    a timing circuit (18, 91) connected to said counters and controlling data exchange of an associated one of said counters (22, 23; 24, 25) with respect to the actual value signal derived from said transducers.

2. An apparatus according to claim 1, further comprising a storage switch (19) connected to said timing circuit (18) and logic means (16, 17) coupled to said switches (11, 12) and said counters (22, 23; 24, 25) to control, when the storage switch is operated in conjunction with one of said switches (11, 12), a data change process in at least one of said counters which continues until the difference between the data stored in said counters and the actual value signal from said transducer is equal to a predetermined value.

3. An apparatus according to claim wherein the connecting means includes a signal storage member (13) actuated by one of said positioning switches (11, 12) and a number of switching units (14, 15), the number of which is equal to the number of independent positions assumable by said movable device connected to and controlled by said storage member, said switching units (14, 15) being alternatively actuated by actuation of said signal storage member (13) to connect at least one of said counters (22, 23; 24, 25) in a closed control loop with said mechanical-to-electrical transducers.

4. An apparatus according to claim 2 further comprising a bistable element (20, 21) and actuated by said data storage switch (19) and said positioning switch (11, 12) and which is switched into its second stable state when the position of said motor means (48, 53) corresponds to the values stored in said counters (22, 23; 24, 25).

5. An apparatus according to claim 4, further comprising a gate (26, 27) connected behind said bistable element (20, 21), the state of said gate being dependent on the state of said bistable member (20, 21), and a clock source (28), said gate (26, 27) connecting the clock source (28) with the at least two counters (22, 23; 24, 25).

6. An apparatus according to claim 1, including a control gate (45, 50) connected ahead of each of said motor means (48, 53) each of said gates (45, 50) being responsive to the signal of one of said positioning switches (11, 12).

7. An apparatus according to claim 6, further comprising a bistable element (57) connected to open said control gates (45, 50), said bistable element (57) having a first stable state attained by reception of a signal from one of said positioning switches (11, 12) and further including a recognition circuit for placing said bistable element (57) into its second stable state.

8. An apparatus according to claim 1, further comprising a switch element (56) for defining a first direction of movement of the motor means (48, 53) and
    a recognition circuit (63, 62) for generating a signal when the movement of said motor means in the first direction is complete, and permitting said switch element (56) to then control said motor means to move in a second and opposite direction of motion.

9. An apparatus according to claim 6, including control amplifiers (37, 41) associated with the different directions of motion of said movable device, and respectively connected to said motor means (48, 53) via gates (45, 50), and switches (47, 52) associated with the motor means, the output signal of said control amplifiers (37, 41) being connected to said switches to control the switches (47, 52) to to change state when the output from the control amplifiers reaches a predetermined level.

10. An apparatus according to claim 9 including means for changing an input signal to said control amplifiers (37, 41) by a small amount subsequent to the termination of displacements in a first direction of adjustment to cause the switches (47, 52) associated with the motor means (48, 53) to change state.

11. An apparatus according to claim 1, wherein said mechanical-to-electrical transducers (40, 42) coupled to said motor means (48, 53) are contactless transducers.

12. An apparatus according to claim 1, wherein said mechanical-to-electrical transducers (40, 42) coupled to said motor means (48, 53) are transducers, each having a spindle and said motor means are servo motors (48, 53) having drive shafts coupled to said spindles of said transducers (40, 42).

13. An apparatus according to claim 1, wherein one of said positioning switches is embodied as the door-jamb switch of a motor vehicle, said movable device is a passenger seat and the actuation of said door-jamb switch controls said motor means to provide rearward motion only of said passenger seat in said motor vehicle.

14. An apparatus according to claim 1, further comprising an indicator device connected to indicate the presence of a data storage command in said counters.

15. An apparatus according to claim 14, including means for applying said data storage command signal for a short time to said motor means (48).

16. An apparatus according to claim 1, further including means for preventing minor adjustments of said movable device, said means including circuit means to change the input signals to said control loop by a small amount and for a short time in the direction such that when the direction of adjustment of said movable device is such as to increase its actual value, the relative difference between the setpoint value and the actual value is reduced whereas, when the direction of motion of the position of said movable device is such as to reduce the actual value thereof, the relative difference between the set-point value and the actual value is increased by a small amount.

17. An apparatus according to claim 1, containing a timing circuit (115, 116, 117, 118) for sequential actuation of said motor means (48, 53) to reduce the magnitude of the actuation current.

18. An apparatus according to claim 1, further comprising additional motor means (147, 148) and a switching unit (146) permitting selective control by command signals to be selectively applied to said motor means (48, 53) or said additional motor means (147, 148), said switching unit (146) being actuated by at least one of the position switches (11, 12 or 144, 145).

19. An apparatus according to claim 1, wherein said electrical storage units and said positioning switches are includes in a single chip microcomputer.

20. Apparatus according to claim 8, wherein the switch element comprises a bistable circuit.

21. Apparatus according to claim 1, wherein the timing circuit (91) is connected to and actuated by at least one of said positioning switches (11, 12).

* * * * *